(12) United States Patent
Lamoureux et al.

(10) Patent No.: US 12,184,740 B1
(45) Date of Patent: Dec. 31, 2024

(54) SYSTEMS AND METHODS FOR ENABLING CARE RECEIVERS TO LIVE SAFELY AND INDEPENDENTLY

(71) Applicant: Verizon Patent and Licensing Inc., Basking Ridge, NJ (US)

(72) Inventors: Robert R Lamoureux, La Jolla, CA (US); Mohanraj Umapathy, San Diego, CA (US); Feng Shi, San Diego, CA (US); Gagan Arora, San Diego, CA (US); Chintan Sheth, San Diego, CA (US); Firas Behjet Arabo, Spring Valley, CA (US); Amanda UyenTrang Mai, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/339,642

(22) Filed: Jun. 22, 2023

(51) Int. Cl.
  *G06F 15/173* (2006.01)
  *H04L 67/12* (2022.01)
  *H04L 67/306* (2022.01)

(52) U.S. Cl.
  CPC ............ *H04L 67/306* (2013.01); *H04L 67/12* (2013.01)

(58) Field of Classification Search
  CPC .............................. H04L 67/306; H04L 67/12
  See application file for complete search history.

(56) References Cited

U.S. PATENT DOCUMENTS

| | | | |
|---|---|---|---|
| 10,257,185 B2 * | 4/2019 | Wong | H04W 12/06 |
| 11,540,136 B2 * | 12/2022 | Owens | G06F 21/43 |
| 2016/0044451 A1 * | 2/2016 | Marth | H04W 4/029 340/8.1 |
| 2019/0253243 A1 * | 8/2019 | Zimmerman | H04W 4/80 |
| 2021/0319894 A1 * | 10/2021 | Sobol | G06N 7/01 |

* cited by examiner

*Primary Examiner* — Joseph R Maniwang

(57) ABSTRACT

A system may receive, from a first user device, a request to create an account for an application that monitors a second user device, and may receive an indication that the second user device is not associated with an account. The system may cause an account to be created for the second user device, and may provide, to the first user device, an indication that the account is created. The system may receive, from the first user device, a request to associate the second user device with the account, and may receive an indication that the second user device is eligible for the account. The system may receive, from the first user device, a request to onboard the second user device for the account, and may onboard the second user device for the account. The system may perform actions based on the second user device being onboarded.

20 Claims, 9 Drawing Sheets

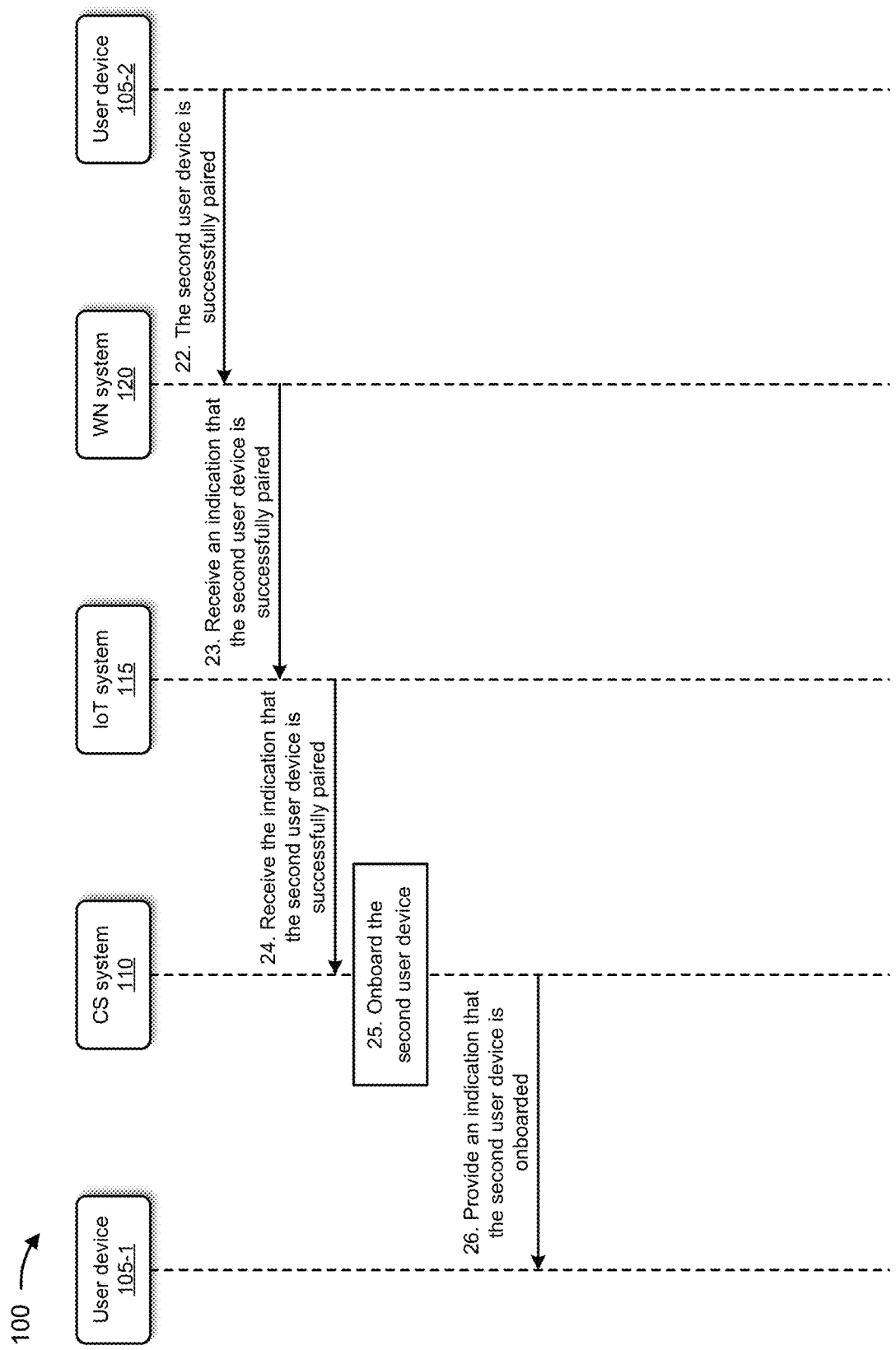

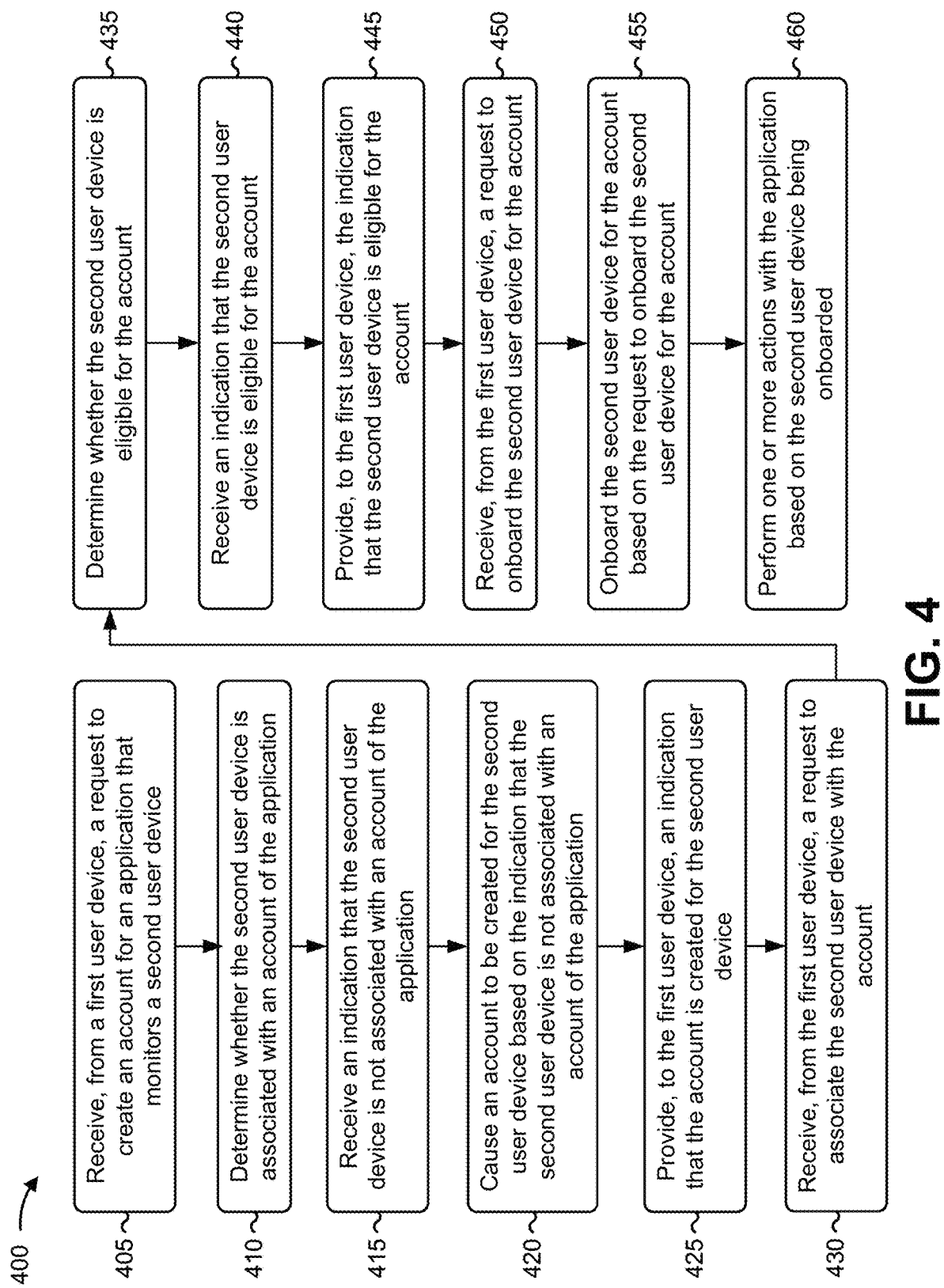

SYSTEMS AND METHODS FOR ENABLING CARE RECEIVERS TO LIVE SAFELY AND INDEPENDENTLY

BACKGROUND

A care receiver may include an elderly person, a young child, a mentally handicapped person, a physically disabled person, and/or the like. The population of elderly people over the age of seventy-five is projected to double in the next thirty years.

BRIEF DESCRIPTION OF THE DRAWINGS

FIGS. 1A-1F are diagrams of an example associated with enabling care receivers to live safely and independently.

FIG. 4 is a flowchart of an example process for enabling care receivers to live safely and independently.

DETAILED DESCRIPTION OF EXAMPLE EMBODIMENTS

Figure 1A:
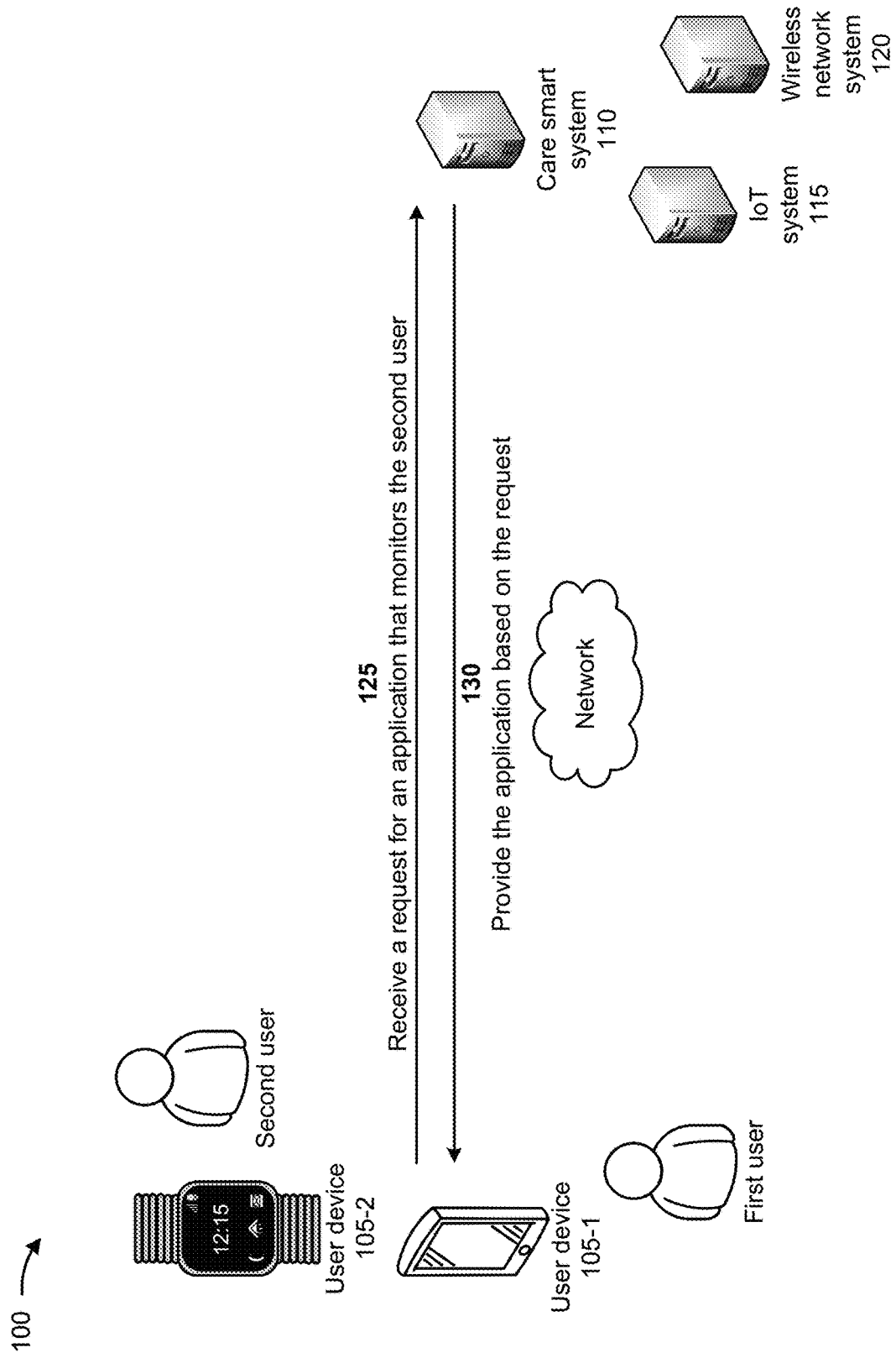

The following detailed description of example implementations refers to the accompanying drawings. The same reference numbers in different drawings may identify the same or similar elements.

Thirty percent of elderly people (e.g., people older than a particular age, such as sixty-five) admit to speaking to less than one person a day, and loneliness has become a leading cause of depression for elderly people. Elderly care facilities are experiencing a funding crisis, and the number of elderly care facilities has been decreasing over the last five years. The remaining elderly care facilities struggle to find and retain staff, which impacts the quality of care provided to elderly people. The average fees for the elderly care facilities are expected to increase significantly, and many elderly people need to sell their homes in order to afford the elderly care facilities. Many elderly people believe that there is a poor standard of care for elderly people in their own homes and the elderly care facilities. Most elderly people want to stay at home where research suggests that elderly people are happier, and their rate of degradation is reduced. However, current resources fail to provide adequate in-home care for elderly people at reasonable costs.

Thus, current techniques for caring for care receivers (e.g., elderly people) consume computing resources (e.g., processing resources, memory resources, communication resources, and/or the like), networking resources, and/or other resources associated with failing to provide adequate in-home care for elderly people at reasonable costs, failing to properly monitor elderly people in their homes, failing to handle depression associated with elderly people, inadequately notifying caregivers about issues associated with elderly people, and/or the like.

Some implementations described herein provide a care smart system that enables care receivers to live safely and independently. For example, the care smart system may receive, from a first user device, a request to create an account for an application that monitors a second user device, and may determine whether the second user device is associated with an account of the application. The care smart system may receive an indication that the second user device is not associated with an account of the application, and may cause an account to be created for the second user device based on the indication that the second user device is not associated with an account of the application. The care smart system may provide, to the first user device, an indication that the account is created for the second user device, and may receive, from the first user device, a request to associate the second user device with the account. The care smart system may determine whether the second user device is eligible for the account, and may receive an indication that the second user device is eligible for the account. The care smart system may provide, to the first user device, the indication that the second user device is eligible for the account, and may receive, from the first user device, a request to onboard the second user device for the account. The care smart system may onboard the second user device for the account based on the request to onboard the second user device for the account, and may perform one or more actions with the application based on the second user device being onboarded.

In this way, the care smart system enables care receivers to live safely and independently. For example, the care smart system may provide a solution that enables elderly people to live confidently and independently while providing caregivers with peace of mind via dedicated user devices (e.g., a smartwatch and a mobile device) and companion mobile applications. The care smart system may provide a scalable and remote caregiver solution that can be supported across many device types, such as wearable devices, mobile telephones, home devices, and/or the like. In some implementations, the care smart system may be part of an Internet of Things (IoT) system (e.g., that includes microservices to handle IoT consumer flow across device types), may be separate from the IoT system, and/or the like. The care smart system may enable features, such as professional monitoring, fall detection, smart alert notification, location services, and/or the like, that provide peace of mind for caregivers of elderly people. Thus, the care smart system may conserve computing resources, networking resources, and/or other resources that would have otherwise been consumed by failing to provide adequate in-home care for elderly people at reasonable costs, failing to properly monitor elderly people in their homes, failing to handle depression associated with elderly people, inadequately notifying caregivers about issues associated with elderly people, and/or the like.

FIGS. 1A-1F are diagrams of an example 100 associated with enabling care receivers to live safely and independently. As shown in FIGS. 1A-1F, example 100 includes a first user device 105-1 (e.g., a mobile telephone) associated with a first user, a second user device 105-2 (e.g., a wearable device, such as a smartwatch) associated with a second user, a care smart system 110, an IoT system 115, and a wireless network system 120. Further details of the user devices 105, the care smart system 110, the IoT system 115, and the wireless network system 120 are provided elsewhere herein.

As shown in FIG. 1A, and by reference number 125, the care smart system 110 may receive a request for an application that monitors the second user (e.g., a care receiver). For example, the first user (e.g., a caregiver, such as an adult child supporting an elderly parent) may utilize the first user device 105-1 to request a subscription to the application associated with the care smart system 110. The first user device 105-1 may provide the request for the subscription to the application to the care smart system 110, and the care smart system 110 may receive the request for the subscription to the application. In some implementations, the first user device 105-1 may provide the request for the application to a digital distribution service that hosts the application along with other applications provided by third parties.

As further shown in FIG. 1A, and by reference number 130, the care smart system 110 may provide the application based on the request. For example, the care smart system 110 may provide the application to the first user device 105-1 (e.g., via a download) based on the request for the application. The first user device 105-1 may download the application from the care smart system 110 (e.g., or the digital distribution service) and may store the application in the first user device 105-1. The first user may cause the first user device 105-1 to execute the application, so that the first user may access features of the application and the care smart system 110.

Figure 1B:
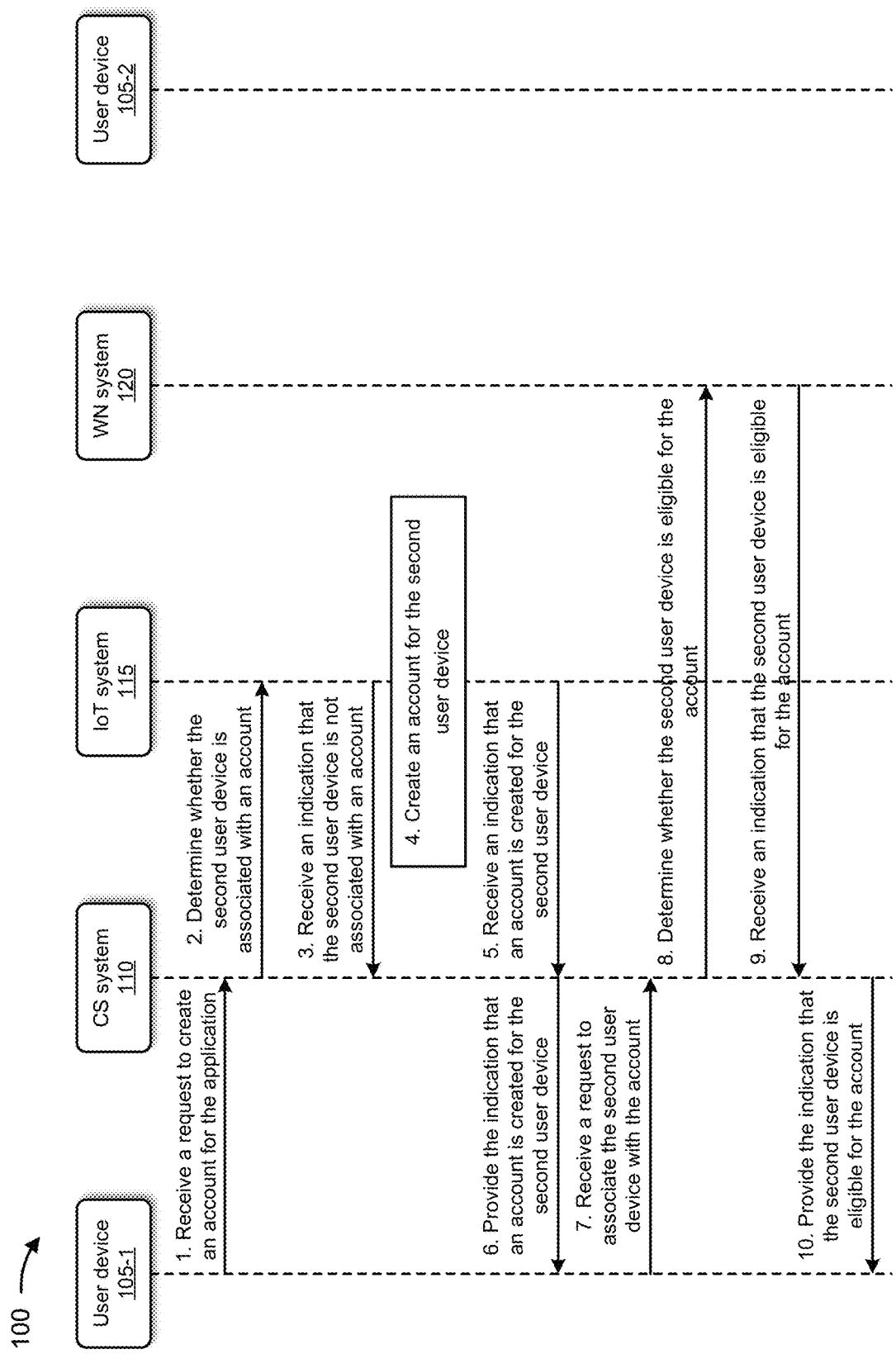

As shown in FIG. 1B, and by reference number 1, the care smart system 110 may receive a request to create an account for the application. For example, the first user device 105-1 may utilize the application to generate the request to create the account for the application. In some implementations, the request to create the account may include an identifier associated with the first user, such as an email address of the first user, a mobile device number (MDN) of the second user device 105-2, a mobile identification number (MIN) of the second user device 105-2, and/or the like. The first user device 105-1 may provide the request to create the account for the application to the care smart system 110, and the care smart system 110 may receive the request to create the account. As shown by reference number 2, the care smart system 110 may determine whether the second user device 105-2 is associated with an account. For example, the care smart system 110 may validate the request to create the account and may determine whether the second user device 105-2 is already associated with an account. In some implementations, the care smart system 110 may utilize the MDN or the MIN of the second user device 105-2 to determine whether the second user device 105-2 is already associated with an account. The care smart system 110 may provide the MDN or the MIN of the second user device 105-2 to the IoT system 115, and the IoT system 115 may determine whether an account exists for the second user device 105-2 based on the MDN or the MIN. In some implementations, the IoT system 115 may determine that an account exists for the second user device 105-2 based on the MDN or the MIN. Alternatively, the IoT system 115 may determine that an account does not exist for the second user device 105-2 based on the MDN or the MIN.

As shown by reference number 3 of FIG. 1B, the care smart system 110 may receive an indication that the second user device 105-2 is not associated with an account. For example, when the IoT system 115 determines that an account does not exist for the second user device 105-2 based on the MDN or the MIN, the IoT system 115 may generate the indication that the second user device 105-2 is not associated with an account and may provide the indication to the care smart system 110. The care smart system 110 may receive the indication that the second user device 105-2 is not associated with an account from the IoT system 115. As shown by reference number 4, the IoT system 115 may create an account for the second user device 105-2. For example, when the IoT system 115 determines that an account does not exist for the second user device 105-2 based on the MDN or the MIN, the IoT system 115 may create the account for the second user device 105-2. In some implementations, the IoT system 115 may provision the account according to a schema that applies to services provided by care smart system 110 and the application. As shown by reference number 5, the care smart system 110 may receive an indication that an account is created for the second user device 105-2. For example, when the IoT system 115 creates the account for the second user device 105-2, the IoT system 115 may generate the indication that the account is created for the second user device 105-2 and may provide the indication that the account is created to the care smart system 110. The care smart system 110 may receive the indication that the account is created for the second user device 105-2 from the IoT system 115. In some implementations, the indication that the account is created for the second user device 105-2 may include an authorization token that enables the first user to access the account.

As shown by reference number 6 of FIG. 1B, the care smart system 110 may provide the indication that the account is created for the second user device 105-2. For example, the care smart system 110 may provide, to the first user device 105-1, the indication that the account is created for the second user device 105-2 and the authorization token. The first user device 105-1 may receive the indication and the authorization token, and may utilize the authorization token to access the account created for the second user device 105-2. As shown by reference number 7, the care smart system 110 may receive a request to associate the second user device 105-2 with the account. For example, the application of the first user device 105-1 may request an identifier (e.g., an MDN, an MIN, an international mobile equipment identity (IMEI), and/or the like) of the second user device 105-2 to associate with the account. The first user may provide the identifier of the second user device 105-2, and the first user device 105-1 may generate the request to associate the second user device 105-2 with the account. In some implementations, the request may include the identifier of the second user device 105-2. The first user device 105-1 may provide the request to associate the second user device 105-2 with the account to the care smart system 110, and the care smart system 110 may receive the request from the first user device 105-1.

As shown by reference number 8 of FIG. 1B, the care smart system 110 may determine whether the second user device 105-2 is eligible for the account. For example, in order to determine whether the second user device 105-2 is eligible for the account, the care smart system 110 may provide the identifier of the second user device 105-2 to the wireless network system 120. The wireless network system 120 may determine whether the second user device 105-2 is eligible for the account based on the identifier of the second user device 105-2. In some implementations, the wireless network system 120 may determine eligibility for the account based on the identifier of the second user device 105-2, whether a device type of the second user device 105-2 is supported, whether the second user device 105-2 has cellular capability, whether the second user device 105-2 has cellular service, and/or the like. In some implementations, the wireless network system 120 may determine that the second user device 105-2 is eligible for the account. Alternatively, the wireless network system 120 may determine that the second user device 105-2 is not eligible for the account.

As shown by reference number 9 of FIG. 1B, the care smart system 110 may receive an indication that the second user device 105-2 is eligible for the account. For example, when the wireless network system 120 determines that the second user device 105-2 is eligible for the account, the wireless network system 120 may generate the indication that the second user device 105-2 is eligible for the account and may provide the indication to the care smart system 110. The care smart system 110 may receive the indication that the second user device 105-2 is eligible for the account from the wireless network system 120. As shown by reference number 10, the care smart system 110 may provide the indication that the second user device 105-2 is eligible for the account. For example, the care smart system 110 may provide the indication that the second user device 105-2 is eligible for the account to the first user device 105-1, and the first user device 105-1 may receive the indication from the care smart system 110.

Figure 1C:
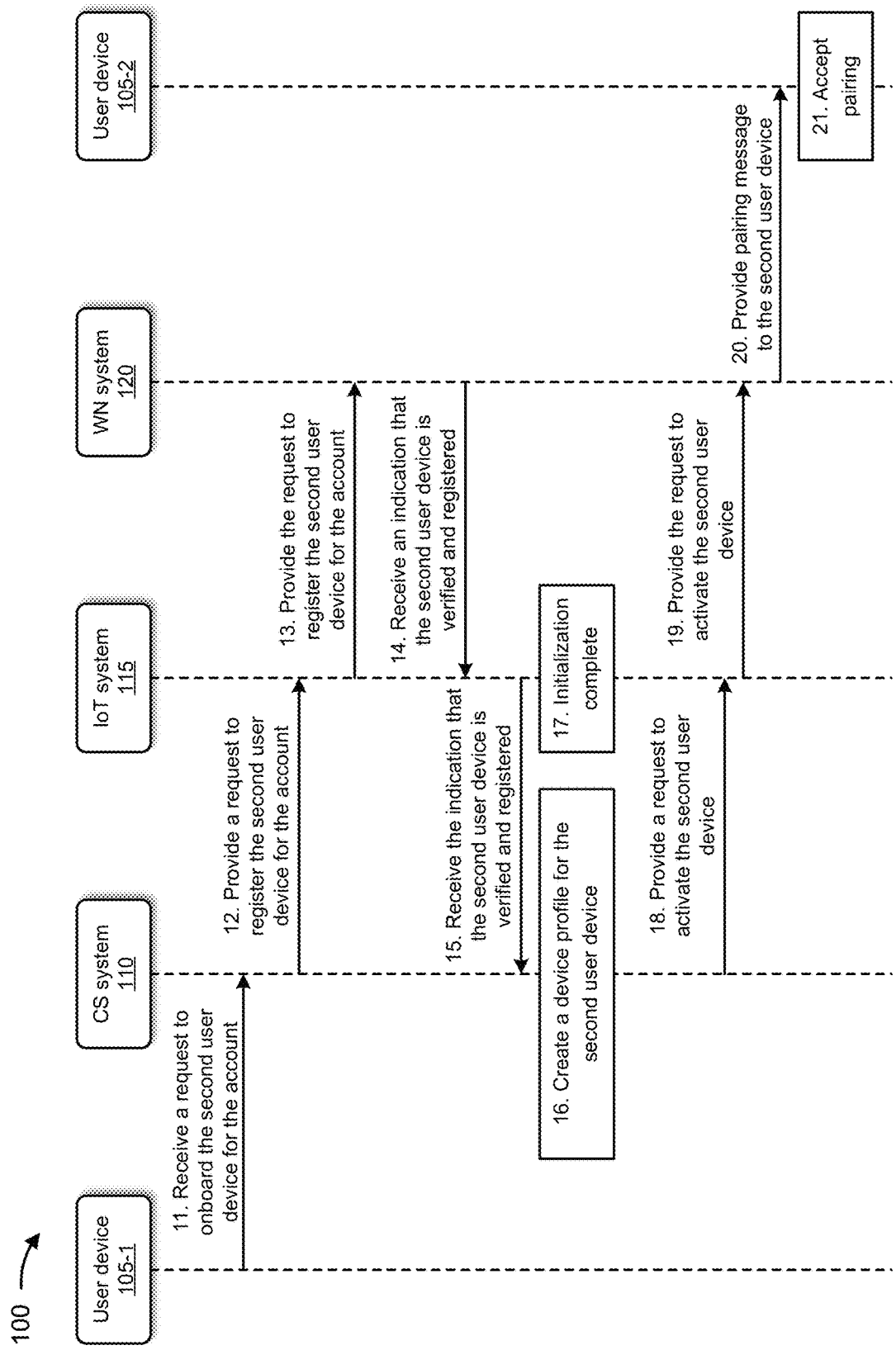

As shown in FIG. 1C, and by reference number 11, the care smart system 110 may receive a request to onboard the second user device 105-2 for the account. For example, when the second user device 105-2 is eligible for the account, the first user device 105-1 may generate the request to onboard the second user device 105-2 for the account, and may provide the request to the care smart system 110. The care smart system 110 may receive the request to onboard the second user device 105-2 for the account from the first user device 105-1. As shown by reference number 12, the care smart system 110 may provide a request to register the second user device 105-2 for the account. For example, when the request to onboard the second user device 105-2 is received, the care smart system 110 may generate the request to register the second user device 105-2 for the account and may provide the request to the IoT system 115. The IoT system 115 may receive the request to register the second user device 105-2 for the account from the care smart system 110. As shown by reference number 13, the IoT system 115 may provide the request to register the second user device 105-2 for the account. For example, the IoT system 115 may provide the request to register the second user device 105-2 for the account to the wireless network system 120. The wireless network system 120 may receive the request to register the second user device 105-2 for the account from the IoT system 115.

As shown by reference number 14 of FIG. 1C, the IT system 115 may receive an indication that the second user device 105-2 is verified and registered. For example, the wireless network system 120 may verify the identifier of the second user device 105-2 with the account and may register the second user device 105-2 with the account. The wireless network system 120 may generate the indication that the second user device 105-2 is verified and registered based on verifying the identifier of the second user device 105-2 and registering the second user device 105-2 with the account. The wireless network system 120 may provide the indication that the second user device 105-2 is verified and registered to the IoT system 115, and the IoT system 115 may receive the indication from the wireless network system 120. As shown by reference number 15, the care smart system 110 may receive the indication that the second user device 105-2 is verified and registered. The IoT system 115 may provide the indication that the second user device 105-2 is verified and registered to the care smart system 110, and the care smart system 110 may receive the indication from the IoT system 115.

As shown by reference number 16 of FIG. 1C, the care smart system 110 may create a device profile for the second user device 105-2. For example, when the care smart system 110 receives the indication that the second user device 105-2 is verified and registered, the care smart system 110 may create the device profile for the second user device 105-2. In some implementations, the device profile may include connection data for communications between the second user device 105-2 and the care smart system 110, service configuration data (e.g., geofencing, fall detection, step counting, and/or the like) associated with the second user device 105-2, and/or the like. As shown by reference number 17, the IoT system 115 may complete the initialization of the second user device 105-2. For example, the care smart system 110 may provide the device profile and the identifier of the second user device 105-2 to the IoT system 115, and the IoT system 115 may complete the initialization of the second user device 105-2 based on the device profile and the identifier of the second user device 105-2. In some implementations, the IoT system 115 may send the device profile and the identifier of the second user device 105-2 to a mobile personal emergency response (mPERS) provider. The mPERS provider may utilize a communications interface (e.g., a short message service (SMS) interface, a push notification interface, and/or the like) specific to the second user device 105-2 when exchanging information with the second user device 105-2.

As shown by reference number 18 of FIG. 1C, the care smart system 110 may provide a request to activate the second user device 105-2. For example, after creating the device profile for the second user device 105-2, the care smart system 110 may generate the request to activate the second user device 105-2. The care smart system 110 may provide the request to activate the second user device 105-2 to the IoT system 115, and the IoT system 115 may receive the request to activate the second user device 105-2 from the care smart system 110. As shown by reference number 19, the IoT system 115 may provide the request to activate the second user device 105-2. For example, the IoT system 115 may provide the request to activate the second user device 105-2 to the wireless network system 120, and the wireless network system 120 may receive the request to activate the second user device 105-2 from the IoT system 115. As shown by reference number 20, the wireless network system 120 may provide a pairing message to the second user device 105-2. For example, based on the request to activate the second user device 105-2, the wireless network system 120 may generate the pairing message and may provide the pairing message to the second user device 105-2. As shown by reference number 21, the second user device 105-2 may accept the pairing. For example, the second user device 105-2 may receive the pairing message from the wireless network system 120, and may accept the pairing based on the pairing message.

As shown in FIG. 1D, and by reference number 22, the second user device 105-2 may be successfully paired. For example, once the second user device 105-2 accepts the pairing, the second user device 105-2 may be successfully paired with the wireless network system 120. As shown by reference number 23, the IoT system 115 may receive an indication that the second user device 105-2 is successfully paired. For example, when the second user device 105-2 is successfully paired, the wireless network system 120 may generate the indication that the second user device 105-2 is successfully paired and may provide the indication that the second user device 105-2 is successfully paired to the IoT system 115. The IoT system 115 may receive the indication that the second user device 105-2 is successfully paired from the wireless network system 120. As shown by reference number 24, the care smart system 110 may receive the indication that the second user device 105-2 is successfully paired. For example, the IoT system 115 may forward the indication that the second user device 105-2 is successfully paired to the care smart system 110, and the care smart system 110 may receive the indication that the second user device 105-2 is successfully paired from the IoT system 115. As shown by reference number 25, the care smart system 110 may onboard the second user device 105-2. For example, once the second user device 105-2 is successfully paired, the care smart system 110 may onboard the second user device 105-2 for utilization of the services provided by the care smart system 110 (e.g., via the application). As shown by reference number 26, the care smart system 110 may provide an indication that the second user device 105-2 is onboarded. For example, once the second user device 105-2 is onboarded, the care smart system 110 may generate the indication that the second user device 105-2 is onboarded and may provide the indication that the second user device 105-2 is onboarded to the first user device 105-1. The first user device 105-1 may receive the indication that the second user device 105-2 is onboarded from the care smart system 110.

Figure 1E:
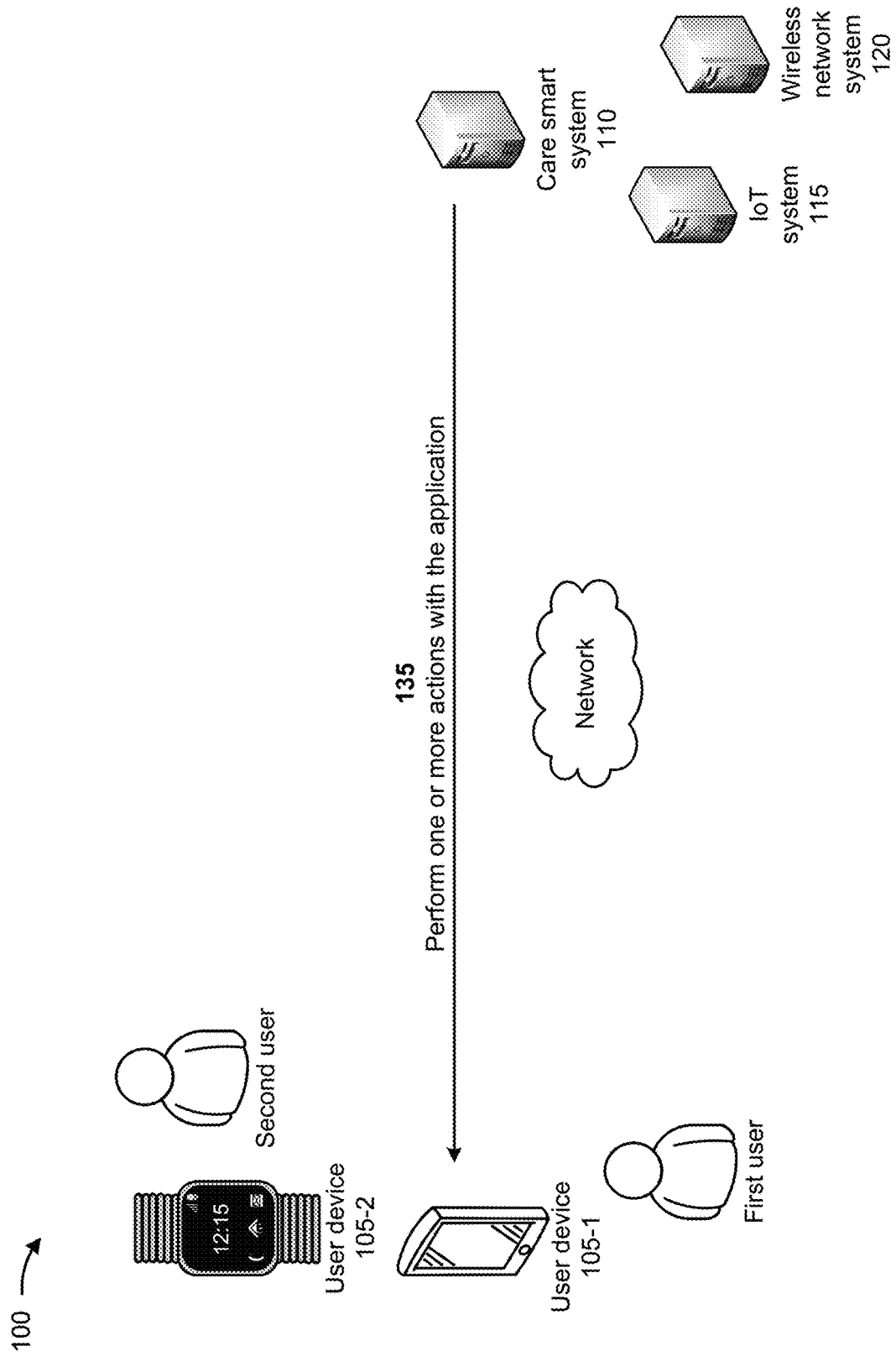

As shown in FIG. 1E, and by reference number 135, the care smart system 110 may perform one or more actions with the application. For example, the care smart system 110 may perform one or more of the actions with the application described below in connection with FIG. 1F. In some implementations, the care smart system 110 may provide users with features, such as professional monitoring of an elderly person, fall detection for an elderly person, smart alert notification for a caregiver, location services of an elderly person, and/or the like, that provide peace of mind for caregivers caring for aging loved ones. The care smart system 110 may provide a token-agnostic architecture that allows flexible support across many device types, such as wearable devices, mobile telephones, home devices, and/or the like. The care smart system 110 may provide a set of microservices that allows effective management of care receiver devices and user accounts, such as an accounts service, a configuration service, a device service, a groups service, a user service, a provisioning service, a notifications service, a data initiation service, a cellular network service, and/or the like. The care smart system 110 may also provide a set of application programming interfaces (APIs) that provide services to care receiver devices, accounts, users, groups, configuration data, and/or the like.

The care smart system 110 may provide location tracking of the second user device 105-2, caregiver trusted contacts (e.g., a trusted circle), communication through the application (e.g., wearable alerts for emergency notifications, location, battery levels, and/or the like), voice and text communications with both standalone and number sharing, text-to-speech services, health and fitness services, and/or the like. The professional monitoring service enables management of professional monitoring subscriptions within the care smart system 110. An emergency event group messaging service may notify a caregiver and a trusted circle in the event of an emergency or a fall detection. The fall detection/caregiver alert may provide caregivers with real time fall detection alerts via the application. The care smart system 110 may be built on an architecture in which the application includes a collection of microservices. The microservices may include processes that communicate with each other using language-agnostic APIs and over a network using technology-agnostic protocols. The microservices may be small, loosely-coupled, and independently deployable. The care smart system 110 may provide an interface developed for companion mobile applications and other customer front applications to interact with wireless network internal systems, and applications and another interface developed for integrating devices provided by partners of a wireless network provider.

Figure 1F:
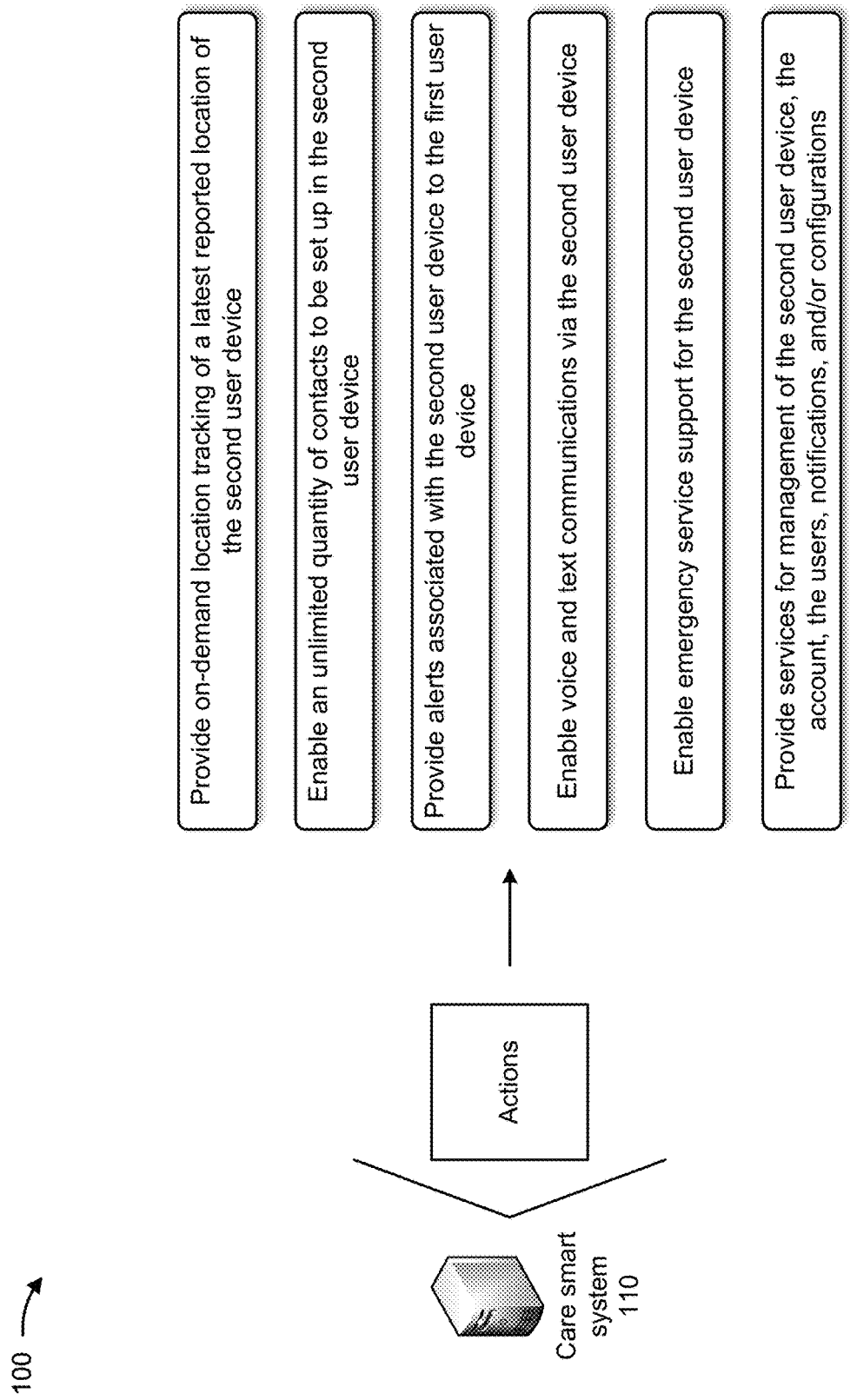

As shown in FIG. 1F, performing the one or more actions may include the care smart system 110 providing on-demand location tracking of a latest reported location of the second user device 105-2. For example, the care smart system 110 may continuously track a location of the second user device 105-2, and may provide, to the first user device 105-1, on-demand location tracking of the latest reported location of the second user device 105-2. The care smart system 110 may also provide global positioning system (GPS) coordinates of the second user device 105-2, and a latitude and a longitude of the second user device 105-2 to the first user device 105-1 (e.g., via the application) to ensure continued safety of the second user. In this way, the care smart system 110 conserves computing resources, networking resources, and/or other resources that would have otherwise been consumed by failing to properly monitor elderly people in their homes.

In some implementations, performing the one or more actions includes the care smart system 110 enabling an unlimited quantity of contacts to be set up in the second user device 105-2. For example, the care smart system 110 may provide peace of mind for close family and friends of the second user by enabling an unlimited quantity of contacts to be set up in multiple trust circles in the second user device 105-2. This may allow the second user to quickly and easily connect with a member of a trust circle. In this way, the care smart system 110 conserves computing resources, networking resources, and/or other resources that would have otherwise been consumed by failing to provide adequate in-home care for elderly people at reasonable costs.

In some implementations, performing the one or more actions includes the care smart system 110 providing alerts associated with the second user device 105-2 to the first user device 105-1. For example, the care smart platform 110 may provide, to the first user device 105-1, alerts associated with emergency events for the second user, a location of the second user device 105-2, a battery level available for communication for the second user device 105-2, and/or the like. In this way, the care smart system 110 conserves computing resources, networking resources, and/or other resources that would have otherwise been consumed by inadequately notifying caregivers about issues associated with elderly people, and/or the like.

In some implementations, performing the one or more actions includes the care smart system 110 enabling voice and text communications via the second user device 105-2. For example, the care smart platform 110 may provide voice and text communications support for the second user device 105-2. This may enable the second user to communicate with caregivers and/or emergency support personnel. In this way, the care smart system 110 conserves computing resources, networking resources, and/or other resources that would have otherwise been consumed by failing to handle depression associated with elderly people.

In some implementations, performing the one or more actions includes the care smart system 110 enabling emergency service support for the second user device 105-2. For example, the care smart system 110 may enable emergency calls with location information for the second user device 105-2, and within a predetermined time period (e.g., in seconds) may notify emergency personnel, caregivers, or any trusted circle member about the emergency situation. In this way, the care smart system 110 conserves computing resources, networking resources, and/or other resources that would have otherwise been consumed by failing to provide adequate in-home care for elderly people at reasonable costs.

In some implementations, performing the one or more actions includes the care smart system 110 providing services for management of the second user device 105-2, the account, the users, notifications, and/or configurations. For example, the care smart system 110 may provide several services or microservices, such as a device service that enables management of the second user device 105-2 within the care smart system 110; an accounts service that enables management of accounts within the care smart system 110; a user service that enables management of users within the care smart system 110; a groups service that enables management of user device groups within the care smart system 110; a notifications service that enables management of notifications for users within the care smart system 110; a configuration service that enables management of configuration data within the care smart system 110; and/or a professional monitoring service that enables management of professional monitoring subscriptions within the care smart system 110. In this way, the care smart system 110 may conserve computing resources, networking resources, and/or other resources that would have otherwise been consumed by failing to provide adequate in-home care for elderly people at reasonable costs.

In this way, the care smart system 110 enables care receivers to live safely and independently. For example, the care smart system 110 may provide a solution that enables elderly people to live confidently and independently while providing caregivers with peace of mind via dedicated user devices and companion mobile applications. The care smart system 110 may provide a scalable and remote caregiver solution that can be supported across many device types, such as wearable devices, mobile telephones, home devices, and/or the like. In some implementations, the care smart system 110 may be part of an IoT system, may be separate from the IoT system, and/or the like. The care smart system 110 may enable features, such as professional monitoring, fall detection, smart alert notification, location services, and/or the like, that provide peace of mind for caregivers of elderly people. Thus, the care smart system 110 may conserve computing resources, networking resources, and/or other resources that would have otherwise been consumed by failing to provide adequate in-home care for elderly people at reasonable costs, failing to properly monitor elderly people in their homes, failing to handle depression associated with elderly people, inadequately notifying caregivers about issues associated with elderly people, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
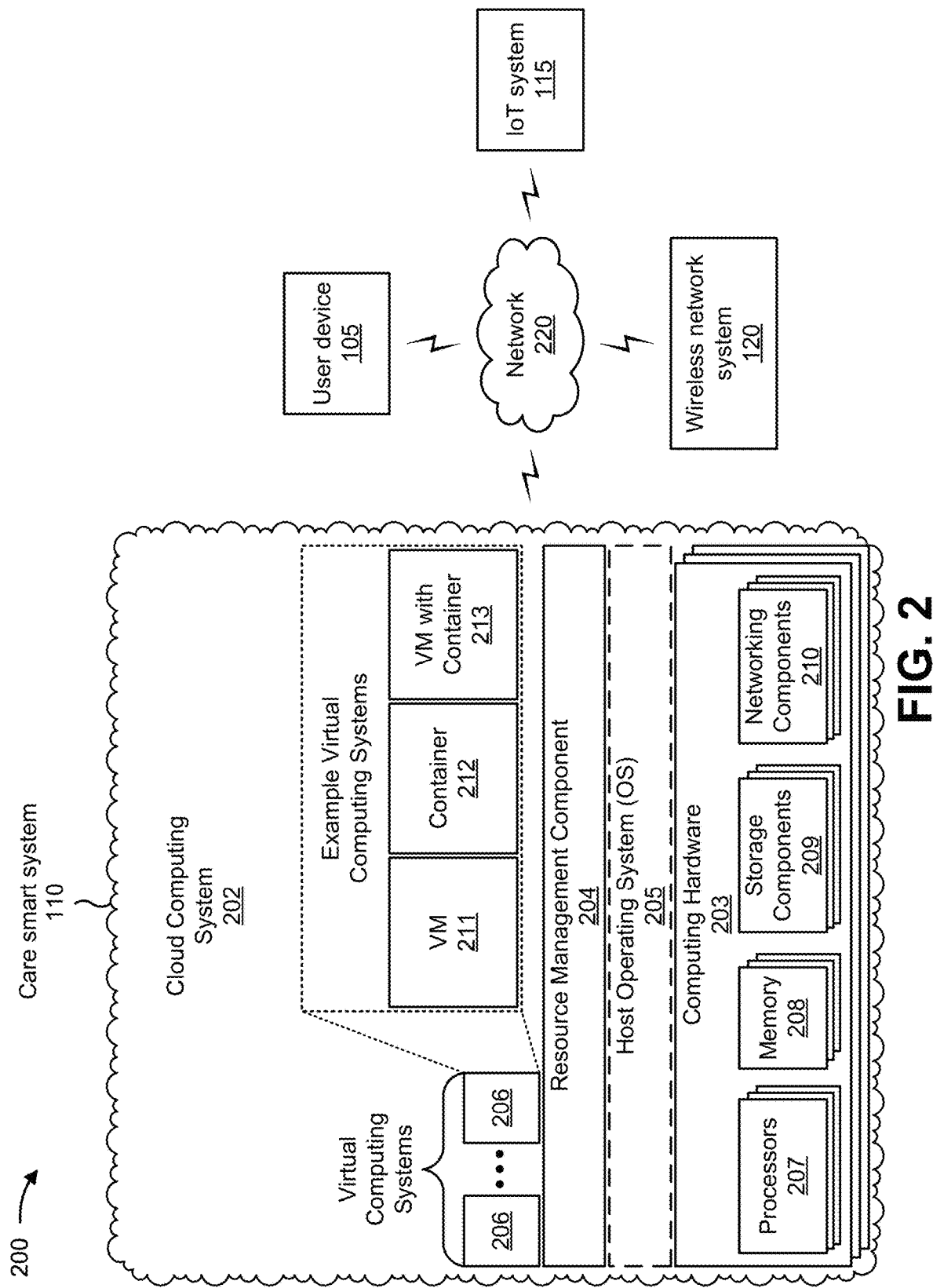
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the care smart system 110, which may include one or more elements of and/or may execute within a cloud computing system 202. The cloud computing system 202 may include one or more elements 203-213, as described in more detail below. As further shown in FIG. 2, the environment 200 may include the user device 105, the IoT system 115, the wireless network system 120, and/or a network 220. Devices and/or elements of the environment 200 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), an autonomous vehicle, or a similar type of device.

The IoT system 115 may include one or more devices capable of receiving, generating, storing, processing, providing, and/or routing information, as described elsewhere herein. The IoT system 115 may include a communication device and/or a computing device. For example, the IoT system 115 may include a server, such as an application server, a client server, a web server, a database server, a host server, a proxy server, a virtual server (e.g., executing on computing hardware), or a server in a cloud computing system. In some implementations, the IoT system 115 may include computing hardware used in a cloud computing environment.

The wireless network system 120 may include one or more devices capable of receiving, generating, storing, processing, providing, and/or routing information, as described elsewhere herein. The wireless network system 120 may include a communication device and/or a computing device. For example, the wireless network system 120 may include a server, such as an application server, a client server, a web server, a database server, a host server, a proxy server, a virtual server (e.g., executing on computing hardware), or a server in a cloud computing system. In some implementations, the wireless network system 120 may include computing hardware used in a cloud computing environment.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the care smart system 110 may include one or more elements 203-213 of the cloud computing system 202, may execute within the cloud computing system 202, and/or may be hosted within the cloud computing system 202, in some implementations, the care smart system 110 may not be cloud-based (e.g., may be implemented outside of a cloud computing system) or may be partially cloud-based. For example, the care smart system 110 may include one or more devices that are not part of the cloud computing system 202, such as the device 300 of FIG. 3, which may include a standalone server or another type of computing device. The care smart system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
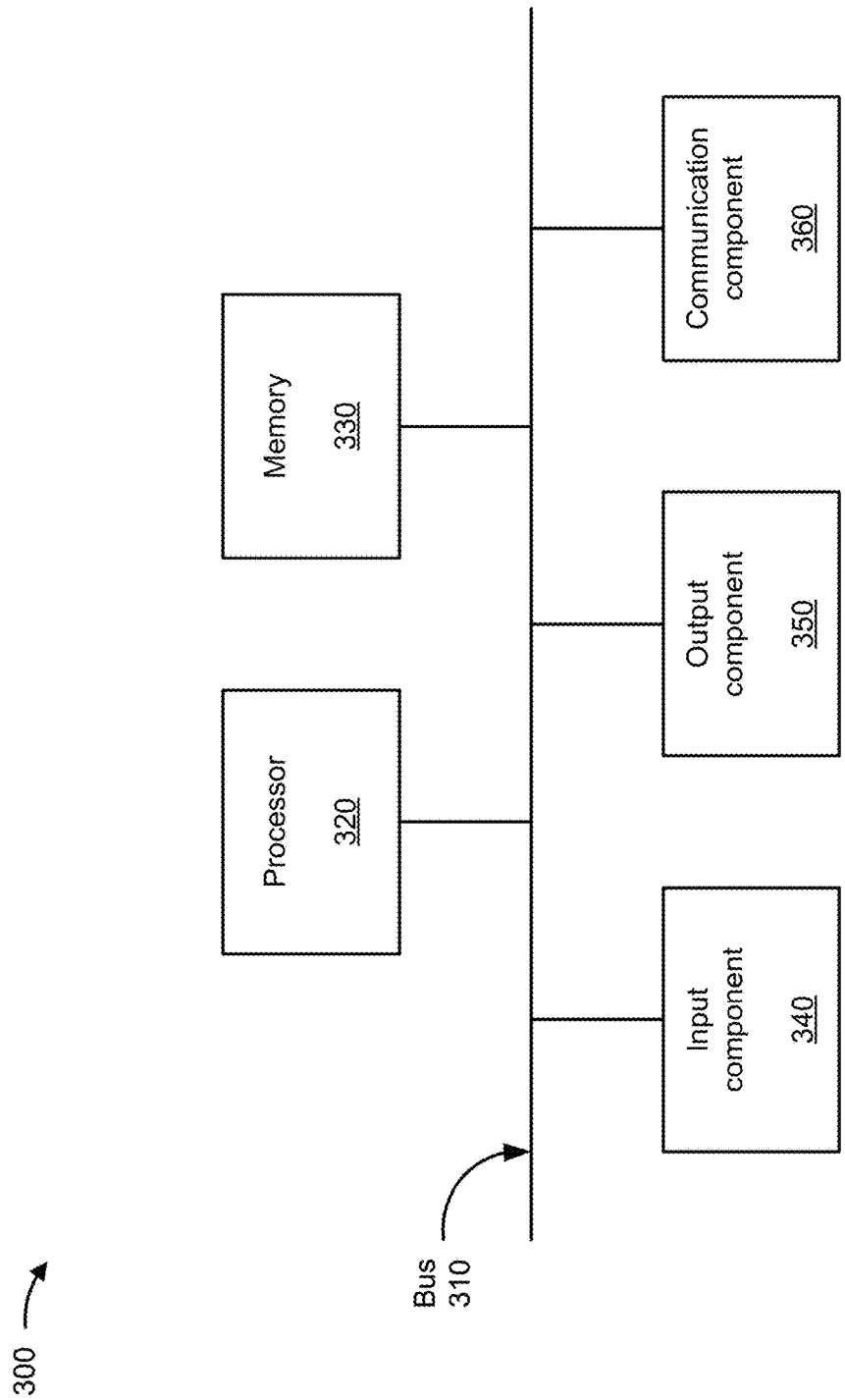
FIG. 3 is a diagram of example components of one or more devices of FIG. 2.

FIG. 3 is a diagram of example components of a device 300, which may correspond to the user device 105, the care smart system 110, the IoT system 115, and/or the wireless network system 120. In some implementations, the user device 105, the care smart system 110, the IoT system 115, and/or the wireless network system 120 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for enabling care receivers to live safely and independently. In some implementations, one or more process blocks of FIG. 4 may be performed by a system (e.g., the care smart system 110). In some implementations, one or more process blocks of FIG. 4 may be performed by another device or a group of devices separate from or including the system, such as a user device (e.g., the user device 105), an IoT system (e.g., the IoT system 115), and/or a wireless network system (e.g., the wireless network system 120). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a first user device, a request to create an account for an application that monitors a second user device (block 405). For example, the system may receive, from a first user device, a request to create an account for an application that monitors a second user device, as described above. In some implementations, the second user device is a wearable device associated with a care receiver. In some implementations, the first user device is associated with a caregiver of a user of the second user device.

As further shown in FIG. 4, process 400 may include determining whether the second user device is associated with an account of the application (block 410). For example, the system may determine whether the second user device is associated with an account of the application, as described above.

As further shown in FIG. 4, process 400 may include receiving an indication that the second user device is not associated with an account of the application (block 415). For example, the system may receive an indication that the second user device is not associated with an account of the application, as described above.

As further shown in FIG. 4, process 400 may include causing an account to be created for the second user device based on the indication that the second user device is not associated with an account of the application (block 420). For example, the system may cause an account to be created for the second user device based on the indication that the second user device is not associated with an account of the application, as described above. In some implementations, causing the account to be created for the second user device includes providing, to an Internet of Things (IoT) system, a request to associate the second user device with the account, and receiving, from the IoT system, confirmation of association of the account with the second user device and an authorization token for the account. In some implementations, providing, to the first user device, the indication that the account is created for the second user device includes providing, to the first user device, the authorization token with the indication that the account is created for the second user device.

As further shown in FIG. 4, process 400 may include providing, to the first user device, an indication that the account is created for the second user device (block 425). For example, the system may provide, to the first user device, an indication that the account is created for the second user device, as described above.

As further shown in FIG. 4, process 400 may include receiving, from the first user device, a request to associate the second user device with the account (block 430). For example, the system may receive, from the first user device, a request to associate the second user device with the account, as described above.

As further shown in FIG. 4, process 400 may include determining whether the second user device is eligible for the account (block 435). For example, the system may determine whether the second user device is eligible for the account, as described above. In some implementations, determining whether the second user device is eligible for the account includes providing, to a wireless network system, an identifier of the second user device, wherein the wireless network system is configured to determine whether the second user device is eligible for the account based on the identifier.

As further shown in FIG. 4, process 400 may include receiving an indication that the second user device is eligible for the account (block 440). For example, the system may receive an indication that the second user device is eligible for the account, as described above. As further shown in FIG. 4, process 400 may include providing, to the first user device, the indication that the second user device is eligible for the account (block 445). For example, the system may provide, to the first user device, the indication that the second user device is eligible for the account, as described above.

As further shown in FIG. 4, process 400 may include receiving, from the first user device, a request to onboard the second user device for the account (block 450). For example, the system may receive, from the first user device, a request to onboard the second user device for the account, as described above.

As further shown in FIG. 4, process 400 may include onboarding the second user device for the account based on the request to onboard the second user device for the account (block 455). For example, the system may onboard the second user device for the account based on the request to onboard the second user device for the account, as described above. In some implementations, onboarding the second user device for the account includes providing, to an Internet of Things (IoT) system, a request to register the second user device for the account; receiving, from the IoT system and based on the request to register the second user device, an indication that the second user device is verified and registered for the account; creating a device profile for the second user device; providing, to the IoT system, a request to activate the second user device based on creating the device profile after initialization is completed by the IoT system; receiving, from the IoT system and based on the request to activate the second user device, an indication that the second user device is activated; onboarding the second user device based on the second user device being activated; and providing, to the first user device, an indication that the second user device is onboarded. In some implementations, the device profile includes connection data for communications between the device and the second user device, and service configuration data for the second user device.

As further shown in FIG. 4, process 400 may include performing one or more actions with the application based on the second user device being onboarded (block 460). For example, the system may perform one or more actions with the application based on the second user device being onboarded, as described above. In some implementations, performing the one or more actions includes one or more of providing on-demand location tracking of a latest reported location of the second user device, or enabling a quantity of contacts to be set up in the second user device. In some implementations, performing the one or more actions includes providing alerts associated with the second user device to the first user device. In some implementations, performing the one or more actions includes one or more of enabling voice and text communications via the second user device, or enabling emergency service support for the second user device. In some implementations, performing the one or more actions includes providing services for one or more of management of the second user device, the account, users of the first user device and the second user device, notifications, or configurations.

In some implementations, process 400 includes receiving, from the first user device, a request for the application that monitors the second user device, and providing the application to the first user device based on the request for the application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a system and from a first user device, a request to create an account for an application that monitors a second user device;
   determining, by the system, whether the second user device is associated with an existing account for the application;
   receiving, by the system, an indication that the second user device is not associated with the existing account for the application;
   causing, by the system, the account to be created for the second user device based on the indication that the second user device is not associated with the existing account for the application;
   providing, by the system and to the first user device, an indication that the account is created for the second user device;
   receiving, by the system and from the first user device, a request to associate the second user device with the account;
   determining, by the system, whether the second user device is eligible for the account;
   receiving, by the system, an indication that the second user device is eligible for the account;
   providing, by the system and to the first user device, the indication that the second user device is eligible for the account;

receiving, by the system and from the first user device, a request to onboard the second user device for the account;

onboarding, by the system, the second user device for the account based on the request to onboard the second user device for the account,
wherein onboarding the second user device comprises:
providing a pairing message to the second user device, and
pairing with the second user device based on the pairing message; and performing, by the system, one or more actions with the application based on the second user device being onboarded, the one or more actions comprising enabling a quantity of caregiver trusted contacts to be set up in the second user device.

2. The method of claim 1, further comprising:
receiving, from the first user device, a request for the application that monitors the second user device; and
providing the application to the first user device based on the request for the application.

3. The method of claim 1, wherein onboarding the second user device for the account comprises:
providing, to an Internet of Things (IoT) system, a request to register the second user device for the account;
receiving, from the IoT system and based on the request to register the second user device, an indication that the second user device is verified and registered for the account;
creating a device profile for the second user device;
providing, to the IoT system, a request to activate the second user device based on creating the device profile after initialization is completed by the IoT system;
receiving, from the IT system and based on the request to activate the second user device, an indication that the second user device is activated;
onboarding the second user device based on the second user device being activated; and
providing, to the first user device, an indication that the second user device is onboarded.

4. The method of claim 3, wherein the device profile includes connection data for communications between the system and the second user device, and service configuration data for the second user device.

5. The method of claim 1, wherein causing the account to be created for the second user device comprises:
providing, to an Internet of Things (IoT) system, a request to associate the second user device with the account; and
receiving, from the IoT system, confirmation of association of the account with the second user device and an authorization token for the account.

6. The method of claim 5, wherein providing, to the first user device, the indication that the account is created for the second user device comprises:
providing, to the first user device, the authorization token with the indication that the account is created for the second user device.

7. The method of claim 1, wherein the second user device is a wearable device associated with a care receiver.

8. A system, comprising:
one or more processors to:
receive, from a first user device, a request to create an account for an application that monitors a second user device;
determine whether the second user device is associated with an existing account for the application;
receive an indication that the second user device is not associated with the existing account for the application;
cause the account to be created for the second user device based on the indication that the second user device is not associated with the existing account for the application;
provide, to the first user device, an indication that the account is created for the second user device;
receive, from the first user device, a request to associate the second user device with the account;
determine whether the second user device is eligible for the account;
receive an indication that the second user device is eligible for the account;
provide, to the first user device, the indication that the second user device is eligible for the account;
receive, from the first user device, a request to onboard the second user device for the account;
onboard the second user device for the account based on the request to onboard the second user device for the account,
wherein the one or more processors, to onboard the second user device, are configured to:
provide a pairing message to the second user device, and
pair with the second user device based on the pairing message; and
perform one or more actions with the application based on the second user device being onboarded, the one or more actions comprising enabling a quantity of caregiver trusted contacts to be set up in the second user device.

9. The system of claim 8, wherein the first user device is associated with a caregiver of a user of the second user device.

10. The system of claim 8, wherein the one or more processors, to determine whether the second user device is eligible for the account, are to:
provide, to a wireless network system, an identifier of the second user device,
wherein the wireless network system is configured to determine whether the second user device is eligible for the account based on the identifier.

11. The system of claim 8, wherein the one or more processors, to perform the one or more actions, are to one or more of:
provide on-demand location tracking of a latest reported location of the second user device.

12. The system of claim 8, wherein the one or more processors, to perform the one or more actions, are to:
provide alerts associated with the second user device to the first user device.

13. The system of claim 8, wherein the one or more processors, to perform the one or more actions, are to one or more of:
enable voice and text communications via the second user device; or
enable emergency service support for the second user device.

14. The system of claim 8, wherein the one or more processors, to perform the one or more actions, are to:
provide services for one or more of management of the second user device, the account, users of the first user device and the second user device, notifications, or configurations.

15. A non-transitory computer-readable medium storing a set of instructions, the set of instructions comprising:
one or more instructions that, when executed by one or more processors of a system, cause the system to:
receive, from a first user device, a request to create an account for an application that monitors a second user device;
determine whether the second user device is associated with an existing account for the application;
receive an indication that the second user device is not associated with the existing account for the application;
cause the account to be created for the second user device based on the indication that the second user device is not associated with the existing account for the application;
provide, to the first user device, an indication that the account is created for the second user device;
receive, from the first user device, a request to associate the second user device with the account;
determine whether the second user device is eligible for the account;
receive an indication that the second user device is eligible for the account;
provide, to the first user device, the indication that the second user device is eligible for the account;
receive, from the first user device, a request to onboard the second user device for the account;
onboard the second user device for the account based on the request to onboard the second user device for the account,
wherein the one or more instructions, that cause the one or more system to onboard the second user device, cause the system to:
provide a pairing message to the second user device, and
pair with the second user device based on the pairing message; and
perform one or more actions with the application based on the second user device being onboarded, the one or more actions comprising enabling a quantity of caregiver trusted contacts to be set up in the second user device.

16. The non-transitory computer-readable medium of claim 15, wherein the one or more instructions further cause the system to:
receive, from the first user device, a request for the application that monitors the second user device; and
provide the application to the first user device based on the request for the application.

17. The non-transitory computer-readable medium of claim 15, wherein the one or more instructions, that cause the system to onboard the second user device for the account, cause the system to:
provide, to an Internet of Things (IoT) system, a request to register the second user device for the account;
receive, from the IoT system and based on the request to register the second user device, an indication that the second user device is verified and registered for the account;
create a device profile for the second user device;
provide, to the IoT system, a request to activate the second user device based on creating the device profile after initialization is completed by the IoT system; and
receive, from the IoT system and based on the request to activate the second user device, an indication that the second user device is activated;
onboard the second user device based on the second user device being activated; and
provide, to the first user device, an indication that the second user device is onboarded.

18. The non-transitory computer-readable medium of claim 15, wherein the one or more instructions, that cause the system to cause the account to be created for the second user device, cause the system to:
provide, to an Internet of Things (IoT) system, a request to associate the second user device with the account; and
receive, from the IoT system, confirmation of association of the account with the second user device and an authorization token for the account.

19. The non-transitory computer-readable medium of claim 18, wherein the one or more instructions, that cause the system to provide, to the first user device, the indication that the account is created for the second user device, cause the system to:
provide, to the first user device, the authorization token with the indication that the account is created for the second user device.

20. The non-transitory computer-readable medium of claim 15, wherein the one or more instructions, that cause the system to determine whether the second user device is eligible for the account, cause the system to:
provide, to a wireless network system, an identifier of the second user device,
wherein the one or more instructions further cause the system to determine whether the second user device is eligible for the account based on the identifier.

* * * * *